United States Patent [19]

Aimura

[11] 4,432,056
[45] Feb. 14, 1984

[54] PROGRAMMABLE ELECTRONIC COMPUTER

[75] Inventor: Harutsugu Aimura, Tokyo, Japan

[73] Assignee: Canon Kabushiki Kaisha, Tokyo, Japan

[21] Appl. No.: 508,986

[22] Filed: Jun. 28, 1983

Related U.S. Application Data

[63] Continuation of Ser. No. 154,870, May 30, 1980, abandoned.

[30] Foreign Application Priority Data

Jun. 5, 1979 [JP] Japan ................................ 54-70396

[51] Int. Cl.$^3$ .............................................. G06F 9/00
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,018,956 | 1/1962 | Hosier et al. ......................... | 364/200 |
| 3,161,855 | 12/1964 | Propster, Jr. et al. ............... | 364/200 |
| 3,559,183 | 1/1971 | Sussenguth ......................... | 364/200 |
| 4,010,452 | 3/1977 | Cazanove ......................... | 364/200 |
| 4,155,120 | 5/1979 | Keefer et al. ......................... | 364/200 |
| 4,164,037 | 8/1979 | Cochran et al. ..................... | 364/700 |
| 4,167,778 | 9/1979 | Sipple ................................... | 364/200 |
| 4,240,137 | 12/1980 | Matsumoto et al. ................. | 364/200 |
| 4,240,139 | 12/1980 | Fukuda et al. ....................... | 364/200 |
| 4,241,396 | 12/1980 | Mitchell et al. ...................... | 364/200 |
| 4,245,302 | 1/1981 | Amdahl ............................... | 364/200 |
| 4,250,547 | 2/1981 | Matsumoto ......................... | 364/200 |
| 4,253,147 | 2/1981 | MacDougall et al. ............... | 364/200 |
| 4,254,461 | 3/1981 | Chemla et al. ...................... | 364/200 |
| 4,274,138 | 6/1981 | Shimokawa ......................... | 364/200 |

*Primary Examiner*—Jerry Smith
*Assistant Examiner*—Gary V. Harkcom
*Attorney, Agent, or Firm*—Fitzpatrick, Cella, Harper & Scinto

[57] ABSTRACT

A programmable electronic computer is provided with a program storage having address locations for storing a program sequence, an address memory for storing an address of the program sequence to be executed, a program read out circuit connected to the address memory and program storage and adapted to read out a program step stored in an address location in the program storage addressed by the address memory. Circuitry is provided for determining, whether or not the contents of the program step read out by the read out circuit is an instruction. A controller is connected to the determination circuitry and is adapted to cause the program sequence stored in the program storage to be executed from the address stored in the address memory when the determination circuitry identifies the contents of the program step as an instruction, and to replace the address stored in the address memory with another address when the determination circuitry does not identify the contents of the program step as an instruction.

6 Claims, 3 Drawing Figures

| ADDRESS | INSTRUCTION CODE | MSB OF INSTRUCTION CODE | INSTRUCTION OF FUNCTION | CLASSIFICATION OF INSTRUCTION FUNCTION |
|---|---|---|---|---|
| 0 | 81 | 1 | I → ACC | INSTRUCTION |
| 1 | 91 | 1 | ACC → MEMORY | INSTRUCTION |
| 2 | 05 | 0 | (05) | ADDRESS |
| 3 | A1 | 1 | COMMENCE PRINTING | INSTRUCTION |
| 4 | 21 | 0 | (A) | CHARACTER |
| 5 | 22 | 0 | (B) | CHARACTER |
| 6 | A2 | 1 | END PRINTING | INSTRUCTION |
| 7 | B1 | 1 | ACC → PRINT | INSTRUCTION |

FIG. 3

PROGRAMMABLE ELECTRONIC COMPUTER

This application is a continuation of application Ser. No. 154,870 filed May 30, 1980, now abandoned.

BACKGROUND OF THE INVENTION

1. Field of the Invention

The present invention relates to an improvement on a programmable electronic computer (hereinafter called programmable computer) which is capable of storing instructions, calculating equations, etc., for example through key operations on a keyboard.

2. Description of the Prior Art

In the conventional programmable computer, the instructions, calculating equations, etc., which are stored in a program storage, for example, from a keyboard, are coded into uniquely corresponding one-step instruction codes, which are read afterwards for the execution of such instructions. In recent years, however, the development of large-scale programmable computers of higher performance have resulted in the use of a more complicated instruction scheme in which one instruction cannot sometimes by represented by a one-step instruction code but is represented by plural steps, so that the instructions of one, two or more steps are mixedly stored in the memory. However, in such system of storing instructions of different lengths, it becomes difficult to simply determine the top address of an instruction represented by plural steps, as in the case of the simple memory address system involving one or two-step instructions alone, and a careless addressing of the program sequences leads to the read out or execution of a code erroneously recognized as an instruction instead of a non-instruction part, thus resulting in an erroneous operation or calculation.

SUMMARY OF THE INVENTION

An object of the present invention is to provide a programmable computer not associated with the above-mentioned drawback of the conventional programmable computers but allowing correct program read out or execution from any program address.

Another object of the present invention is to provide a programmable computer capable, in case a program address indicated by the input device is not directed to an appropriate program location, of searching an appropriate program location and executing the program in its correct form.

Still other objects of the present invention will be made apparent from the following description of the preferred embodiments thereof to be taken in conjunction with the attached drawings.

BRIEF DESCRIPTION OF THE DRAWINGS

The attached drawings illustrate an embodiment of the present invention, wherein:

FIG. 3 is a chart showing an example of the operations of the program according to the present invention.

DETAILED DESCRIPTION OF THE PREFERRED EMBODIMENTS

The present invention will now be explained in detail by means of an embodiment thereof shown in the attached drawings.

Figure 1:
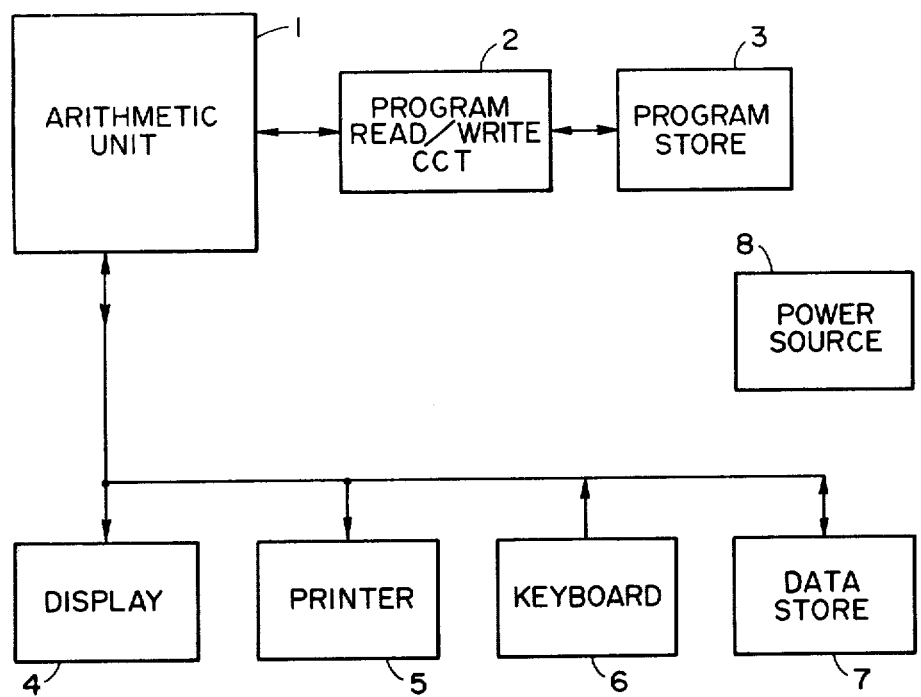
FIG. 1 is a schematic block diagram showing an embodiment of a programmable computer in accordance with the present invention.

FIG. 1 shows the computer in accordance with the present invention in a block diagram, in which an arithmetic unit 1 performs the control of the functions of the various units to be explained later, the program execution and the arithmetic calculations.

Units 2 and 3 are arranged for storing program sequences entered from a keyboard to be explained later and reading the program sequences according to the instructions from arithmetic unit 1. Unit 2 is a program read/write circuit and 3 is a program storage. A display circuit 4 has a display unit for displaying numeric or character information in response to the commands from the arithmetic unit 1. A printer unit 5 has a print control and is adapted for printing numeric or character information in response to the commands from the arithmetic unit 1. A keyboard 6 is used for entering numeric or character information and instructions for controlling the arithmetic unit 1. A data storage 7 stores the numeric and character information. A power source 8 supplies electric power to the foregoing various units of the system.

Figure 2:
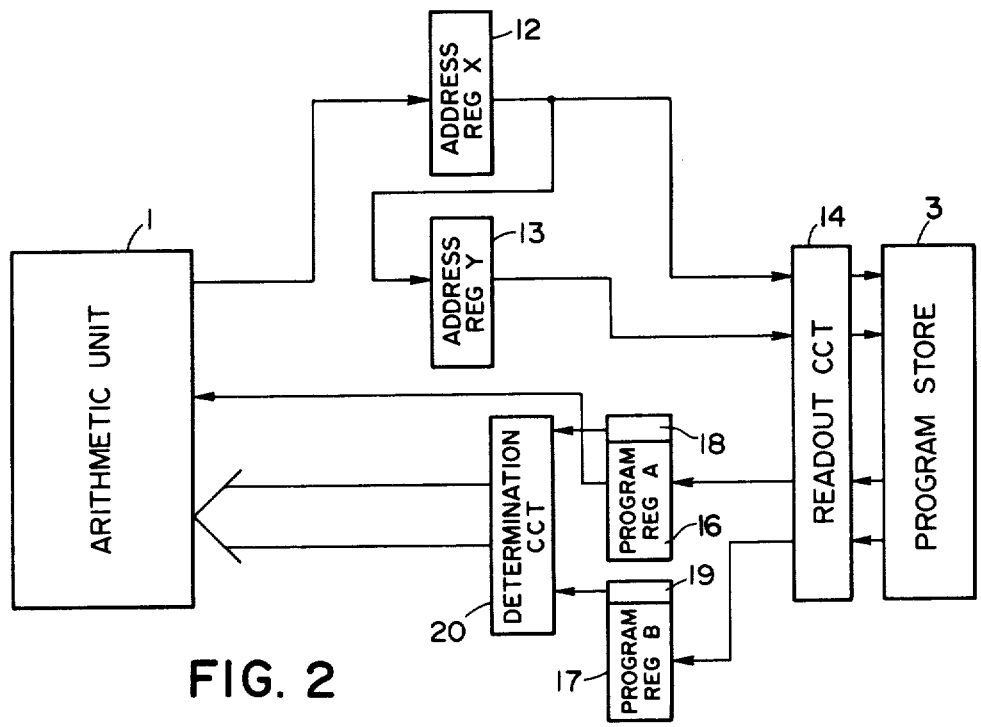
FIG. 2 is a detailed schematic diagram useful in understanding the program read out operations.

FIG. 2 is a detailed view useful in understanding the program read out operations of the program storage in the circuit of FIG. 1. An address register (X) 12 stores address information instructed by the arithmetic unit 1. An adjacent address register (Y) 13 stores the information of an address location adjacent to that stored in address register (X). A program read out circuit 14 supplies the address information stored in registers 12, 13 to a program storage 3 to read the program sequences (as appropriate) location therefrom. A program register (A) 16 stores the program sequences directed to the address information stored in the register 12, having its most significant bit 18. A program register (B) 17 stores the program sequences directed to the address information stored in the register 13, having its most significant bit 19.

A determination circuit 20 determines combinations of the states "1" and "1", "1" and "0", "0" and "0", or "0" and "1" of the uppermost locations of bits 18, 19 to identify whether or not the contents of the register 16 are an instruction, and accordingly to produce instruction determination information or non-instruction determination information. The program information from the register 16 and the instruction and non-instruction determination information are supplied to the arithmetic unit 1.

FIG. 3 shows an example of the program sequence embodying the present invention stored in a part of the program storage 3, in which the addresses and the instruction codes respectively correspond to the contents of registers 12, 13 and to the contents of registers 16, 17. Also the column "MSB of instruction code" indicates the information of the most significant bits 18, 19 of those registers, and the column "Classification of instruction function" indicates the instruction or non-instruction determination information obtained from the determination circuit 20.

Operations of the embodiment in accordance with the present invention will now be explained with reference to FIGS. 1, 2 and 3.

The structure of the programmable computer of the present invention is shown in FIG. 1, in which the function of the keyboard, printer etc., will not be discussed further in detail as it is not different from that in the conventional programmable computers.

In FIG. 3, the words used in the column Instruction of Function represent the following meanings:

[I→ACC] is a one-step instruction composed of an instruction part for placing a number "1" in the accumulating register ACC;

[ACC→MEMORY, (05)] is a two-step instruction composed of an instruction part for storing the content "1" of the accumulator ACC into an address location 05 of the memory, and of an address part;

[COMMENCE PRINTING, (A), (B), END PRINTING] is a four-step instruction composed of an instruction part, a character part, another character part and an instruction part for printing the characters "A" and "B"; and

[ACC→PRINT] is a one-step instruction composed of an instruction part for printing the content "1" of the accumulator ACC.

Also the column "Instruction code" indicates each 8-bit instruction code of which the most significant bit is indicated in the column "MSB of instruction code", and the column "Classification of instruction" indicates the classified function of the instruction, etc.

In the program of the present embodiment composed of one-step and multi-step instructions, the instruction part has an instruction code starting with the most significant bit "1", while the address or character part has an instruction code starting with the most significant bit "0".

Thus the states of the most significant bits of each step and an immediately preceding step change in the following manner:

| Step | MSB of step | MSB of preceding step | Instruction step |
|---|---|---|---|
| 0 | 1 | x | [1 → ACC] |
| 1 | 1 | 1 | [ACC → MEMORY] |
| 2 | 0 | 1 | Address (05) |
| 3 | 1 | 0 | [COMMENCE PRINT] |
| 4 | 0 | 1 | Character (A) |
| 5 | 0 | 0 | Character (B) |
| 6 | 1 | 0 | [END PRINT] |
| 7 | 1 | 1 | [ACC → PRINT] |

The comparison of the foregoing table with FIG. 3 will demonstrate that a step with the most significant digit "1" is the first step of a multi-step instruction, while a step with the most significant digit "0" and with the most significant digit "1" in the preceding step is an address part so that the correct execution of the program sequence should be commenced from the preceding step.

Also a step with the most significant bit "0" and with the most significant bit "0" in the preceding step is a character part, so that the correct execution of the program sequence can be started either from that step or from a third preceding step which is the top step of a multi-step instruction.

Going back to such third preceding step can be achieved by identifying a step with the most significant bit "1".

The instruction code of each step is represented in the column "Instruction code" in FIG. 3. In the present embodiment the steps [1→ACC], [ACC→MEMORY], [COMMENCE PRINT], [END PRINT] and [ACC→PRINT] are respectively represented by instruction codes "81", "91", "A1", "A2" and "B1". Also the characters "A" and "B" are respectively represented by instruction codes "21" and "22". Now the operations of the present embodiment will be discussed in detail while making reference to FIG. 2.

The address register 12 storing the address information of a step and the address register 13 storing the address information of an immediately preceding step instruct the read out of the data of corresponding addresses from the program storage 3. In case the step 1 is executed, address registers X, Y respectively store "1" and "0" to read the data "91" and "81" from the program storage 3, the data being respectively stored in the program register 16 storing the program content of that present step and in the program register 17 storing the program content of the immediately preceding step. Thus the registers 16(A) and 17(B) respectively store "91" and "81". In this state the most significant bits 18, 19 of registers 16(A), 16(B) are both "1". Upon receipt of this information the determination circuit 20 identifies, from the most significant bit "1" of that step, that step is an instruction, so that the arithmetic unit 1 can execute the program sequence from that step. In the case of the step 2, the most significant bits 18, 19 are "0" and "1" as shown in the foregoing table, so that the determination circuit 20, identifying that step as a non-instruction step, produces a non-instruction determination signal, in response to which the arithmetic unit 1 subtracts 1 from the address information for returning to the step 1 in the program sequence. At the step 1 the most significant bits 18, 19 become "1" and "1" as explained before, whereby information indicating that step is an instruction step, obtained in the above-explained manner, is supplied to the arithmetic unit 1 to enable the execution of the program from that step. Also in case the program sequence is set at any of the steps 3 to 7, the arithmetic unit 1, automatically identifying the instruction and non-instruction steps, corrects the starting step of the program sequence and executes the sequence from a step containing an instruction part.

By the addition of a simple circuit to the conventional programmable computer for identifying whether a program step is an instruction part or an information part other than an instruction, the present invention permits execution of the program sequence in the correct manner regardless of the initial read out address location and without affecting the execution time, thus facilitating the execution, editing and correction of the program.

What I claim is:

1. A programmable computer comprising:
   a program memory for storing a plurality of program steps as an instruction of a program sequence, said program memory storing first information in a predetermined part of a first program step of said plurality of program steps and second information in a predetermined part of the remaining program steps of said plurality of program steps;
   address memory means for storing address information corresponding to at least one of said program steps;
   a first program step memory for storing a program step, corresponding to said address information stored in said address memory means, from said program memory;

a second program step memory for storing a program step, corresponding to address information adjacent said address information stored in said address memory means, from said program memory;

determination means connected to said first program step memory and to said second program step memory for determining the content in said predetermined parts of said program step stored in said first program step memory and of said program step stored in said second program step memory, said determination means producing a first signal when first information is stored at least in said first program step memory; and arithmetic operation means responsive to a first signal produced by said determination means for carrying out a program sequence from a program step stored in said first program step memory.

2. A programmable computer according to claim 1, wherein said determination means produces a second signal when second information is stored in said first program step memory and said arithmetic operation means is responsive to said second signal and comprises means for updating said address information of said address memory means.

3. A programmable computer according to claim 1, wherein said address memory means comprises a first register for storing said address information and a second register for storing address information adjacent to said first mentioned address information.

4. A programmable computer according to claim 1, wherein said program memory is an addressable memory.

5. A programmable computer comprising:

a program memory for storing a plurality of program steps as an instruction of a program sequence, said program memory storing first information in a predetermined part of a first program step of said plurality of program steps and second information in a predetermined part of the remaining program steps of said plurality of program steps;

address memory means for storing address information corresponding to at least one of said plurality of program steps;

a program step memory for storing a program step, corresponding to said address information stored in said address memory means, from said program memory;

determination means connected to said program step memory for determining the content of said predetermined part of said program step stored in said program step memory, said determination means producing a first signal when first information is stored in said program step memory and producing a second signal when second information is stored in said program step memory; and arithmetic operation means responsive to a second signal produced by said determination means, when said determination means determines that second information is stored in said program memory, for initiating a program sequence from a program step different from that stored in said program step memory.

6. A programmable computer according to claim 5, wherein said arithmetic operation means comprises means for changing said address information in said address memory means.

* * * * *